(12) United States Patent
Fuchs et al.

(10) Patent No.: US 9,010,928 B2
(45) Date of Patent: Apr. 21, 2015

(54) SPECTACLES

(75) Inventors: Gerhard Fuchs, Kauns (AT); Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 54 days.

(21) Appl. No.: 13/994,910

(22) PCT Filed: Jan. 18, 2012

(86) PCT No.: PCT/AT2012/050007
§ 371 (c)(1),
(2), (4) Date: Jun. 17, 2013

(87) PCT Pub. No.: WO2012/100276
PCT Pub. Date: Aug. 2, 2012

(65) Prior Publication Data
US 2013/0278884 A1    Oct. 24, 2013

(30) Foreign Application Priority Data
Jan. 28, 2011 (AT) ..................... 118/2011

(51) Int. Cl.
*G02C 1/06* (2006.01)
*G02C 1/00* (2006.01)
*G02C 1/04* (2006.01)

(52) U.S. Cl.
CPC .. *G02C 1/10* (2013.01); *G02C 1/04* (2013.01); *G02C 2200/08* (2013.01)

(58) Field of Classification Search
CPC ............................. G02C 1/023; G02C 2200/06
USPC ........................... 351/86, 83, 90, 92, 103, 106
See application file for complete search history.

(56) References Cited

U.S. PATENT DOCUMENTS

| | | | |
|---|---|---|---|
| 2,452,159 A | 10/1948 | Small | |
| 6,863,395 B1 * | 3/2005 | Teng | 351/103 |
| 6,926,404 B2 * | 8/2005 | Bassahon et al. | 351/103 |
| 7,222,958 B1 | 5/2007 | Chiou | |
| 8,408,695 B2 | 4/2013 | Calilung et al. | |
| 8,668,330 B2 * | 3/2014 | Reyes et al. | 351/106 |
| 2008/0137028 A1 * | 6/2008 | Webb | 351/106 |
| 2011/0279771 A1 * | 11/2011 | Chen | 351/140 |

FOREIGN PATENT DOCUMENTS

| | | |
|---|---|---|
| DE | 202 12 399 U1 | 11/2002 |
| WO | WO 03/010590 A1 | 2/2003 |
| WO | WO 2010/003143 A1 | 1/2010 |

OTHER PUBLICATIONS

International Search Report of PCT/AT2012/050007, date of mailing Aug. 8, 2012.

* cited by examiner

*Primary Examiner* — Hung Dang
(74) *Attorney, Agent, or Firm* — Collard & Roe, P.C.

(57) ABSTRACT

Spectacles are described having a frame (1), having two spectacle earpieces (5) attached laterally on the frame (1), having two spectacle lenses (2), which engage in receptacle grooves (3) of the frame (1), and having in each case a detachable mounting device for the spectacle lenses (2) in the receptacle grooves (3), which are interrupted in the region of the earpiece attachment (4), wherein the mounting device has, in the region of the interruption (7) of the receptacle groove (3), a sliding bolt (8), which is mounted on the frame outer side and is displaceable transversely to the edge (9) of the spectacle lenses (2). In order to ensure a secure hold of the spectacle lenses (2), it is proposed that the frame (1) have, on the inner side opposite to the sliding bolt (8), a support stop (11) for the spectacle lens (2) having at least one catch attachment (12) engaging in a catch recess of the spectacle lens (2).

3 Claims, 4 Drawing Sheets

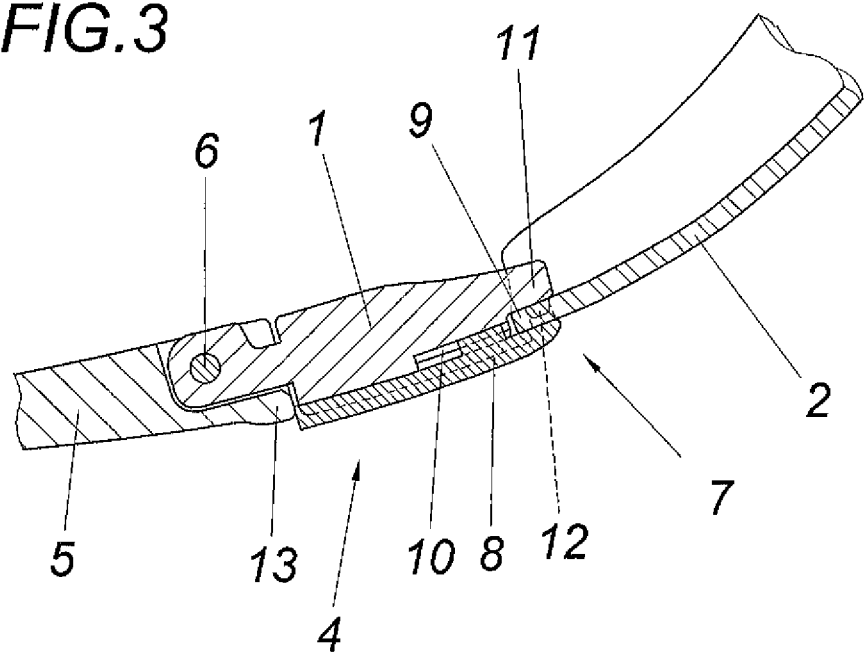
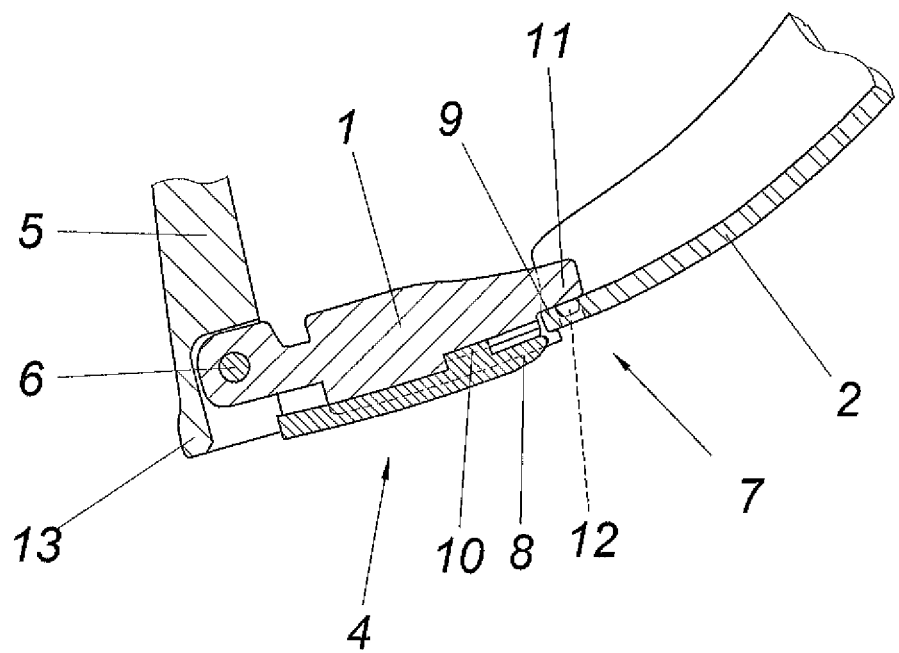

SPECTACLES

CROSS REFERENCE TO RELATED APPLICATIONS

This application is the National Stage of PCT/AT2012/050007 filed on Jan. 18, 2012, which claims priority under 35 U.S.C. §119 of Austrian Application No. A 118/2011 filed on Jan. 28, 2011, the disclosure of which is incorporated by reference. The international application under PCT article 21(2) was not published in English.

FIELD OF THE INVENTION

The invention relates to spectacles having a frame, having two spectacle earpieces attached laterally on the frame, having two spectacle lenses, which engage in receptacle grooves of the frame, and having in each case a detachable mounting device for the spectacle lenses in the receptacle grooves, which are interrupted in the region of the earpiece attachment, wherein the mounting device has, in the region of the interruption of the receptacle groove, a sliding bolt which is mounted on the frame outer side and is displaceable transversely to the edge of the spectacle lenses.

DESCRIPTION OF THE PRIOR ART

To insert spectacle lenses into the receptacle grooves, which are provided for this purpose, of the frame of spectacles, the open frames are closed via closing jaws around the edge of the spectacle lenses or the frames are elastically deformed in such a manner that the spectacle lenses can snap into the receptacle grooves, wherein substantial tensions in the spectacle lenses are unavoidable. In order to avoid these tensions and allows simple replacement of the spectacle lenses, which is required in particular in the case of sports spectacles, subdividing the frame for each spectacle lens in an articulated manner is already known (WO 2010/003143 A1), so that the spectacle lens can be inserted into the receptacle groove with the frame part pivoted out, before the frame is closed, in that the two frame parts are connected to one another with the aid of a closing hook. Another possibility for the replaceable insertion of the spectacle lenses is to implement the front wall of the receptacle grooves as a separate, ring-shaped part, which, after it is removed, exposes a mounting recess which encloses the spectacle lens with play. The spectacle lens therefore only still has to be laid in this mounting recess, in order to then fix the spectacle lens in its location by inserting the ring-shaped front groove wall. This ring-shaped groove wall can engage in the mounting recess like a snap closure or can be linked onto the frame via a film hinge, for example, so that after the ring-shaped groove wall is closed, it only still has to be fixed in the closed position via a closure. All of these embodiments have the disadvantage, however, of the comparatively high design expenditure. In addition, the security of the mounting of the inserted spectacle lenses suffers due to the circumstance that either the frame must be divided or a separate groove wall must be inserted.

To avoid these disadvantages, interrupting the receptacle grooves for the spectacle lenses in the region of the earpiece attachment and providing a sliding bolt, which is mounted on the frame outer side and is displaceable transversely to the edge of the spectacle lenses, in the region of this interruption has already been proposed (DE 202 12 399 U1), so that when the sliding bolt is open, the respective spectacle lens can be detached from the receptacle groove of the frame. The closed sliding bolt prevents the removal of the spectacle lens. However, it is disadvantageous that because of the interruption of the receptacle groove, the mounting of the spectacle lenses in the receptacle grooves can hardly be formed without play. In addition, it is fundamentally not possible to depart from a peripherally-closed setting of the spectacle lenses.

SUMMARY OF THE INVENTION

The invention is therefore based on the object of designing spectacles in such a manner that simple replacement of the spectacle lenses can be ensured, without endangering the security of the mounting of the spectacle lenses or the setting of the spectacle lenses without play. In addition, simple conditions are to be provided in order to also manage with a partial enclosure of the spectacle lenses by the frame.

Proceeding from spectacles of the type described at the beginning, the invention achieves the stated object in that the frame has, on the inner side opposite to the sliding bolt, a support stop for the spectacle lens having at least one catch attachment engaging in a catch recess of the spectacle lens.

With the provision of a support stop for the spectacle lens on the inner side of the frame opposite to the sliding bolt and the arrangement of catch attachments on this support stop, which engage in corresponding catch recesses of the spectacle lens, a displacement of the spectacle lens along the glass edge is prevented. Since the sliding bolt blocks the displacement capability transversely to the spectacle lenses, the spectacle lenses can be fixed securely and without play in the receptacle grooves, and not only with a peripherally closed setting, but rather also in the case of a setting in which the lower setting edge is omitted, for example.

The interruption of the receptacle grooves is to be selected in such a manner that the spectacle lenses can be readily inserted from the side of the interruption into the receptacle grooves. If the depth of the receptacle grooves, which is determined by the height of the front groove wall, decreases toward the interruption, on the one hand, the insertion of the spectacle lenses into the frame-side receptacle grooves is made easier and, on the other hand, the design condition is provided of restricting the interruption of the receptacle grooves to a comparatively small circumferential region of the spectacle lenses.

In order that the spectacle lenses cannot unintentionally exit from the receptacle grooves, securing of the locking position is to be provided for the sliding bolt, in particular in the usage position of the spectacles. For this purpose, the spectacle earpieces linked onto the frame can form, in their extended position, a securing stop for the sliding bolt located in the locking position. By way of this measure, particularly simple design conditions are made possible, because separate safeguards for the locking position of the sliding bolt are omitted. When the spectacle earpieces are pivoted out into the extended usage position, the securing stop formed by the spectacle earpieces is automatically pivoted in front of the sliding bolt located in the locking position, so that opening of the sliding bolt is prevented in the extended position of the spectacle earpieces. However, this also means that it is only possible to replace the spectacle lenses when the spectacle earpieces are pivoted in. Of course, the locking position and the open position of the sliding bolt can also be predetermined by catches, for example, which additionally make the handling easier by the design establishment of these positions of the sliding bolt.

BRIEF DESCRIPTION OF THE DRAWING

The object of the invention is illustrated as an example in the drawing. In the figures:

FIG. 3 shows a section along line of FIG. 2, and FIG. 4 shows an illustration of the spectacles corresponding to FIG. 3, but with partially pivoted-in spectacle earpieces.

DESCRIPTION OF THE PREFERRED EMBODIMENT

Figure 1:
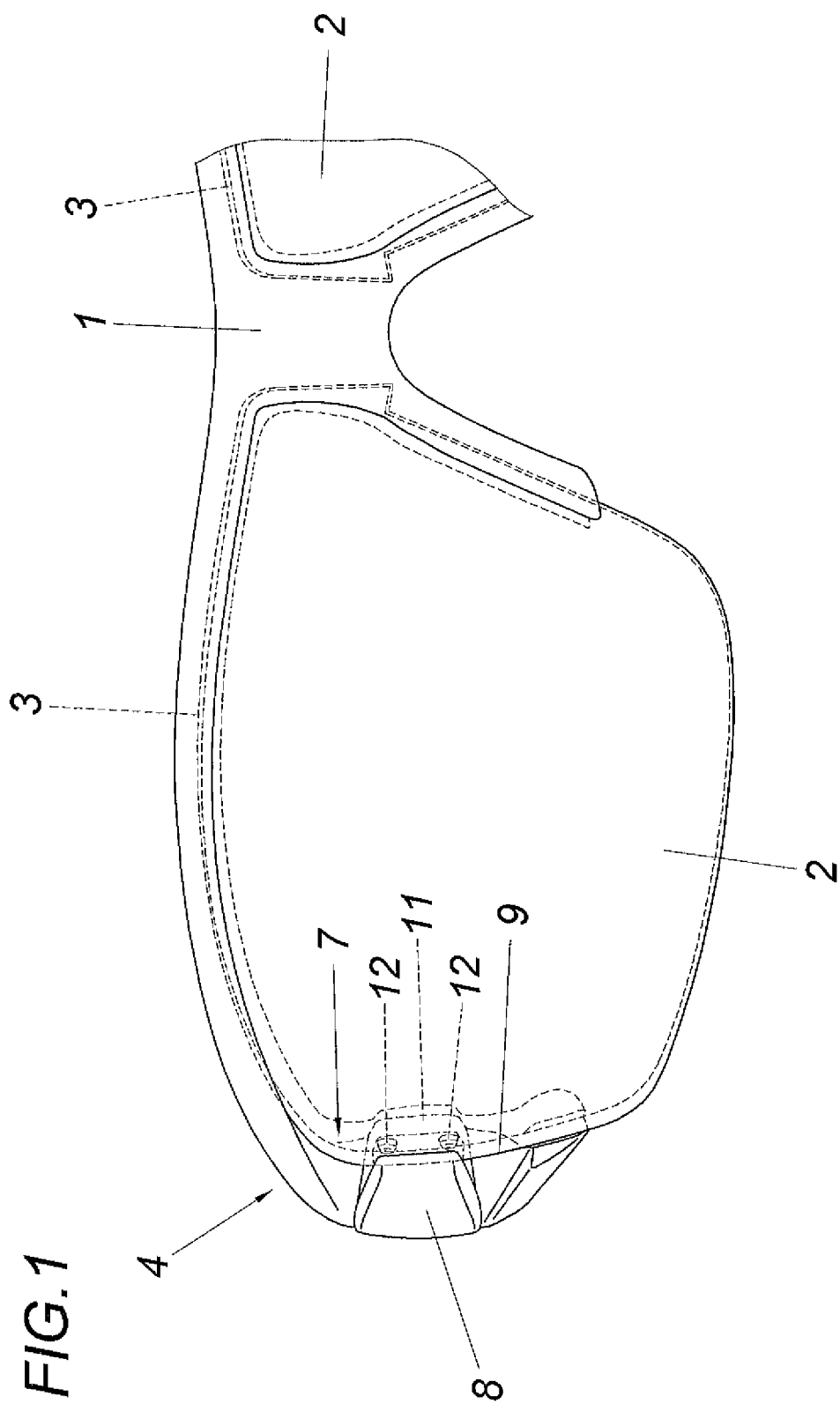
FIG. 1 shows spectacles according to the invention in detail in the region of a spectacle lens in a simplified front view.
Figure 2:
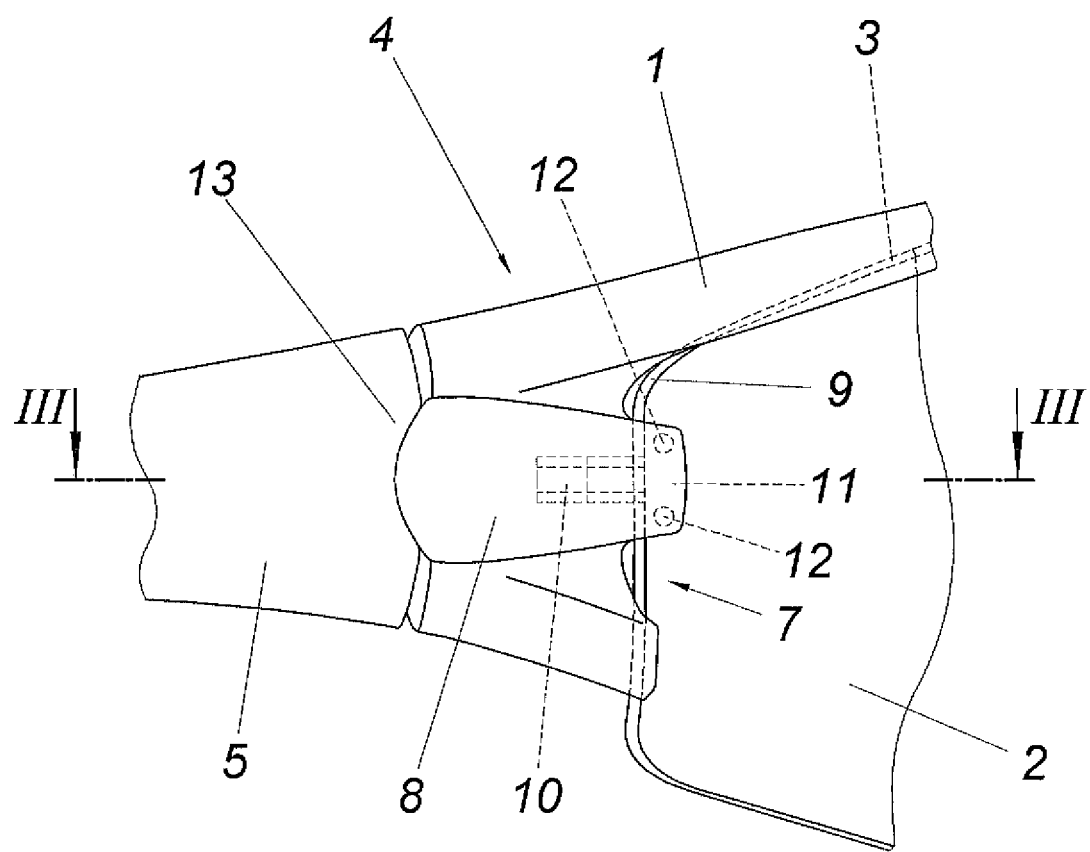
FIG. 2 shows these spectacles in a side view.
Figure 5:
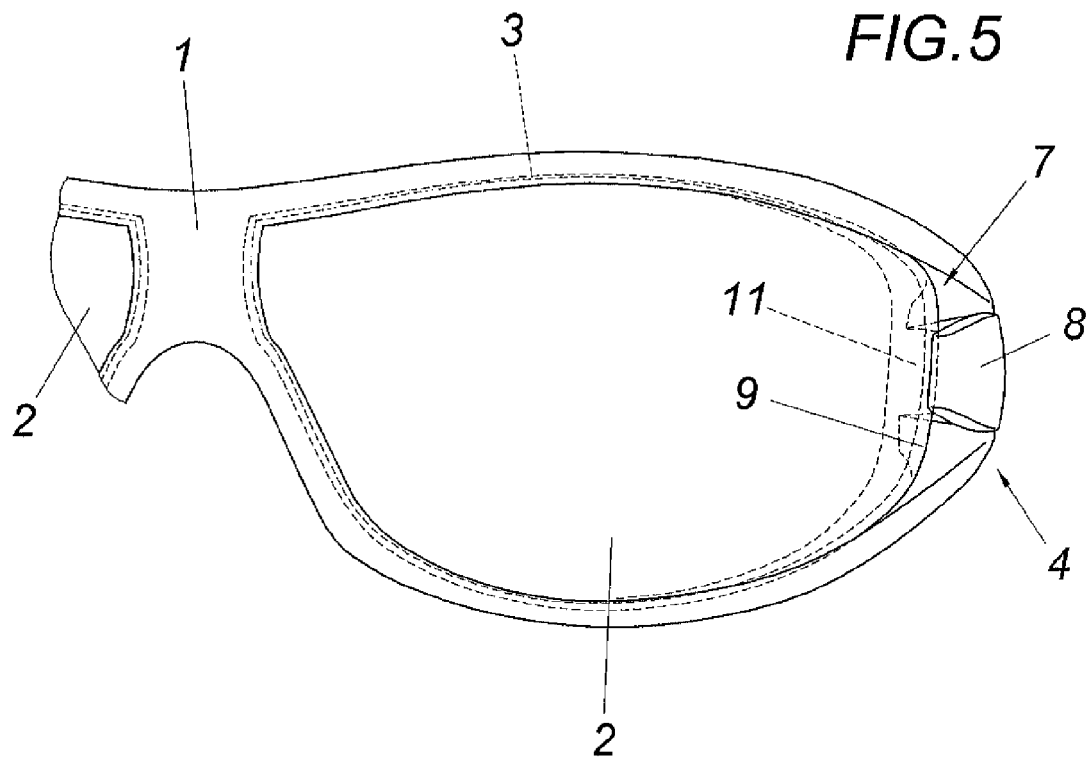
Figure 6:
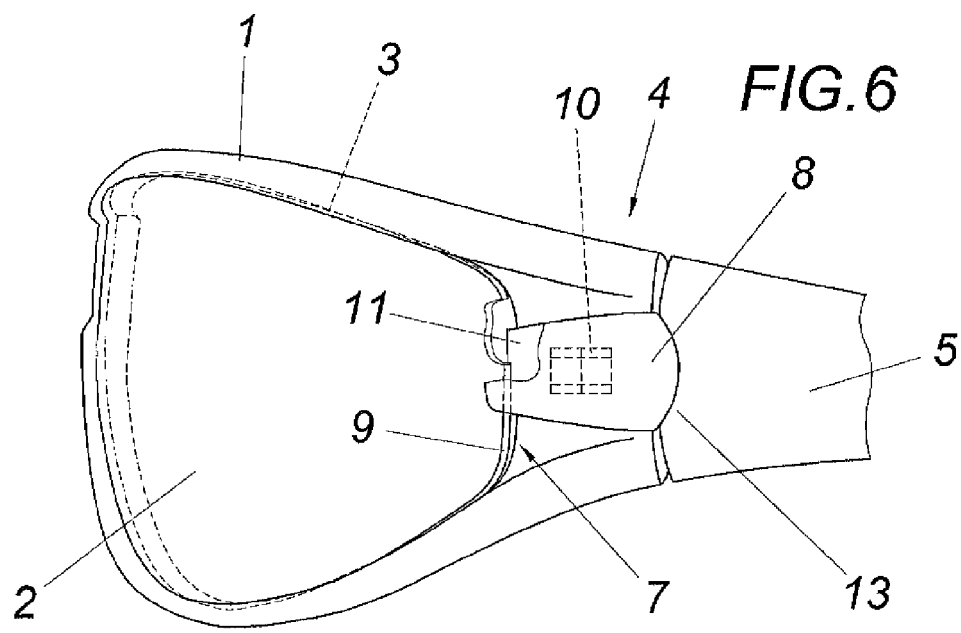

The spectacles according to the illustrated exemplary embodiment have a frame 1, which only partially encloses the spectacle lenses 2, which are preferably manufactured from plastic, so that the lower lens edge remains free. The frame 1 forms receptacle grooves 3 to receive the spectacle lenses 2, which grooves are interrupted in the region of the earpiece attachment 4. The spectacle earpieces 5 are linked in a conventional manner on the frame 1 via a spectacle hinge 6.

A sliding bolt 8 is mounted on the outer side of the frame 1 so it is displaceable transversely to the lens edge 9 in the region of the interruption 7 of the receptacle grooves 3. The slide guide is designated by 10. In the locking position of the sliding bolt 8, which is shown in greater detail in FIG. 3, the sliding bolt 8 overlaps the spectacle lens 2 on the outer side and fixes the spectacle lens 2 on a support stop 11 of the frame 1, which is opposite to the sliding bolt 8. This support stop 11 has two catch attachments 12, which engage in corresponding catch recesses of the spectacle lens 2 and therefore fix the spectacle lens 2 against a displacement along the lens edge 9. With the overlap of the sliding bolt 8, the spectacle lens 2 is prevented from lifting off of the catch attachments 12 and therefore the spectacle lens 2 is securely held in the receptacle grooves 3 of the frame 1.

The locking position, but also the open position of the sliding bolt 8 can be predefined by catches, which make the handling of the sliding bolt 8 easier. To secure the locking position of the sliding bolt 8, the associated spectacle earpiece 5 can additionally have a securing stop 13, which is located in front of the sliding bolt 8 in the extended position of the spectacle earpiece 5, i.e., in its usage position, according to FIG. 3 and prevents the sliding bolt 8 from being displaced out of the locking position according to FIG. 3 into an open position according to FIG. 4. To disengage the sliding bolt 8, the spectacle earpiece 5 is therefore to be pivoted in, as can be inferred from FIG. 4. The pivoted-in spectacle earpiece 5 releases the sliding bolt 8, which can therefore be displaced into the open position, in which the spectacle lens 2 can be lifted off of the catch attachments 12 and can be removed from the receptacle groove 3 of the frame 1. To insert a spectacle lens 2, in the reverse sequence, the spectacle lens 2 is to be inserted into the receptacle groove 3 of the frame 1 and pressed against the support stop 11 of the frame 1 into such a manner that the catch attachments 12 engage in the catch recesses of the spectacle lens 2. Then, to complete the replacement of the spectacle lens 2, the sliding bolt 8 can be displaced into the locking position.

In order to make the insertion of the spectacle lens 2 into the receptacle groove 3 of the frame 1 easier, the depth of the receptacle grooves 3, which is determined by the height of the front groove wall, can go to zero toward the interruption 7, so that the insertion of the spectacle lens 2 into the receptacle grooves 3 from the region of the interruption 7 does not cause any difficulties.

The invention claimed is:

1. Spectacles comprising:
a frame having a first lateral side, a second lateral side, a first groove having a first groove interruption, a second groove having a second groove interruption, a first inner side, a second inner side, a first outer side, a second outer side, a first support stop at the first inner side, a second support stop at the second inner side, at least one first catch attachment at the first support stop, and at least one second catch attachment at the second support stop;
a first earpiece attached to the first lateral side of the frame at a first earpiece attachment region, the first earpiece attachment region being disposed in the first groove interruption;
a second earpiece attached to the second lateral side of the frame at a second earpiece attachment region, the second earpiece attachment region being disposed in the second groove interruption;
a first lens engaged in the first groove, having a first lens edge, and having at least one first lens catch recess;
a second lens engaged in the second groove, having a second lens edge, and having at least one second lens catch recess;
a first sliding bolt in a region of the first groove interruption, mounted on the first outer side of the frame, displaceable transversely to the first lens edge, and disposed opposite from the first inner side of the frame; and
a second sliding bolt in a region of the second groove interruption, mounted on the second outer side of the frame, displaceable transversely to the second lens edge, and disposed opposite from the second inner side of the frame;
wherein the at least one first catch attachment engages in the at least one first lens catch recess;
wherein the at least one second catch attachment engages in the at least one second lens catch recess;
wherein the first sliding bolt has an unlocked position and the first lens can be removed from the frame when the first sliding bolt is in the unlocked position; and
wherein the second sliding bolt has an unlocked position and the second lens can be removed from the frame when the second sliding bolt is in the unlocked position.

2. The spectacles according to claim 1, wherein the first groove has a first groove front wall,
wherein a depth of the first groove is determined by a height of the first groove front wall; and
wherein the depth of the first groove front wall decreases toward the first groove interruption.

3. The spectacles according to claim 1, wherein the first earpiece has an extended position,
wherein the first sliding bolt has a locking position and the first lens is locked to the frame when the first sliding bolt is in the locking position, and
wherein when the first sliding bolt is in the locking position and the first earpiece is in the extended position, the first earpiece forms a securing stop for the first sliding bolt.

* * * * *